United States Patent
Love

(10) Patent No.: US 7,570,228 B2
(45) Date of Patent: *Aug. 4, 2009

(54) VIDEO DIVISION DETECTION METHODS AND SYSTEMS

(75) Inventor: Michael G. Love, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 540 days.

This patent is subject to a terminal disclaimer.

(21) Appl. No.: 11/265,719

(22) Filed: Nov. 2, 2005

(65) Prior Publication Data

US 2006/0044216 A1  Mar. 2, 2006

Related U.S. Application Data

(63) Continuation of application No. 10/409,507, filed on Apr. 8, 2003, now Pat. No. 7,034,776.

(51) Int. Cl.
G09G 5/00 (2006.01)

(52) U.S. Cl. .......................................... 345/1.3; 345/2.1

(58) Field of Classification Search .................. 345/1.1, 345/1.2, 1.3, 2.1, 2.2, 4, 5, 6; 382/286, 294
See application file for complete search history.

(56) References Cited

U.S. PATENT DOCUMENTS

| 4,800,376 | A | 1/1989 | Suga et al. |
| 4,907,095 | A | 3/1990 | Komura et al. |
| 5,040,067 | A | 8/1991 | Nakai et al. |
| 5,801,785 | A | 9/1998 | Crump et al. |
| 5,860,086 | A | 1/1999 | Crump et al. |
| 5,875,463 | A | 2/1999 | Crump et al. |
| 5,923,307 | A | 7/1999 | Hogle, IV |
| 6,008,820 | A | 12/1999 | Chauvin et al. |
| 6,104,414 | A | 8/2000 | Odryna et al. |
| 6,151,621 | A | 11/2000 | Colyer et al. |
| 6,501,441 | B1 | 12/2002 | Ludtke et al. |
| 6,583,771 | B1 | 6/2003 | Furuhashi et al. |
| 6,710,753 | B2 | 3/2004 | Gillespie et al. |
| 6,809,776 | B1 | 10/2004 | Simpson |
| 6,912,695 | B2 | 6/2005 | Ernst et al. |
| 7,034,776 | B1 | 4/2006 | Love |
| 2002/0021296 | A1 | 2/2002 | Tsuji et al. |
| 2002/0033779 | A1 | 3/2002 | Nakai et al. |
| 2002/0163513 | A1 | 11/2002 | Tsuji |
| 2003/0110515 | A1 | 6/2003 | Satoda |
| 2003/0234749 | A1 | 12/2003 | Marks et al. |
| 2004/0145535 | A1 | 7/2004 | Gerk et al. |
| 2004/0222941 | A1* | 11/2004 | Wong et al. .................. 345/1.1 |
| 2005/0002566 | A1 | 1/2005 | Di Federico et al. |
| 2006/0044216 | A1 | 3/2006 | Love |

* cited by examiner

Primary Examiner—Richard Hjerpe
Assistant Examiner—Tom V Sheng
(74) Attorney, Agent, or Firm—Lee & Hayes, PLLC

(57) ABSTRACT

Various embodiments provide means by which a video signal, associated with a multi-region visual display intended for presentation on a single display screen, can be processed in a manner that enables separate regions to be ascertained, and then split off onto different display screens. Detection algorithms can process the video signal in a manner that detects the divisions between the different regions that are intended for display on a single display screen. Once the divisions are detected, the video signal is processed to split the separate regions onto different display screens.

19 Claims, 10 Drawing Sheets

VIDEO DIVISION DETECTION METHODS AND SYSTEMS

RELATED APPLICATION

This is a continuation of and claims priority to U.S. patent application Ser. No. 10/409,507, filed on Apr. 8, 2003, the disclosure of which is incorporated by reference herein.

BACKGROUND

Many video systems have visual displays that can be natively divided into different regions of a display screen. For example, consider the FIG. 1 display device and its illustrated display screen 10. There, a visual display on the screen is divided into four different regions 12, 14, 16, and 18. Each region can contain an image that is different from, or similar to images contained in other regions. For example, the image in region 12 might be a rolling hill landscape, the image in region 14 might be a beach scene, the image in region 16 might be that of a city, and the image in region 18 might be that of a desert. In some user scenarios, it might be advantageous or desirable to isolate the image in one of the particular regions, and provide that isolated image onto a different display screen. For example, one user may be interested in the image of the rolling hill landscape that appears in region 12, and would like to view that image in isolation on another display screen that is connected to the video system. If the video system is specifically designed to provide this type of isolated viewing, then providing an isolated image on another display screen should not be a problem. More often, though, video systems are not specifically designed to support this type of functionality. That is, those types of video systems are configured to provide a single video signal that is to be rendered on a single display screen.

Now consider a gaming environment and, in particular, a multi-player gaming environment. Here, a video system in the form of a gaming platform is provided and enables multiple players to engage in a single video game. For example, FIG. 2 shows a video system 20 that includes a game console 22 and a display device having a display screen 24. Player input devices 26, 28 are provided and are connected to console 22. In this example, the input devices include individual steering wheels and a shifter knob. Assume in this example that the game the players are engaged in is a car racing game in which a first region 30 of the display screen is dedicated to the first player, and a second region 32 of the display screen is dedicated to the second player. In this scenario, the first player receives his or her visual input from region 30, and the second player receives his or her visual input from region 32. So, for example, as the players play the game, each player may see the terrain pass on their region of the display screen as they drive their respective vehicles throughout the game's course.

In some instances, it would be desirable to provide each player's associated display region onto their own display device's display screen. For example, perhaps the players have two different display devices each with its own display screen, and desire to play their game against one another while not sitting beside one another. Additionally, it may not be imperative to the play of the game that the players are seated side-by-side. However, in most if not all so-called legacy game environments, the players do not have this flexibility and, as a result, are forced to sit side-by-side to play their game. That is, many legacy game environments do not contemplate, nor do they support a functionality that allows individual, player-associated regions of the display screen to be split off onto separate display device screens. Yet, it would be desirable to provide such functionality.

SUMMARY

Various embodiments provide means by which a video signal, associated with a multi-region visual display intended for presentation on a single display screen, can be processed in a manner that enables separate regions to be ascertained, and then split off onto different display screens. Detection algorithms can process the video signal in a manner that detects the divisions between the different regions that are intended for display on a single display screen. Once the divisions are detected, the video signal is processed to split the separate regions onto different display screens.

DETAILED DESCRIPTION

Overview

Figure 1:
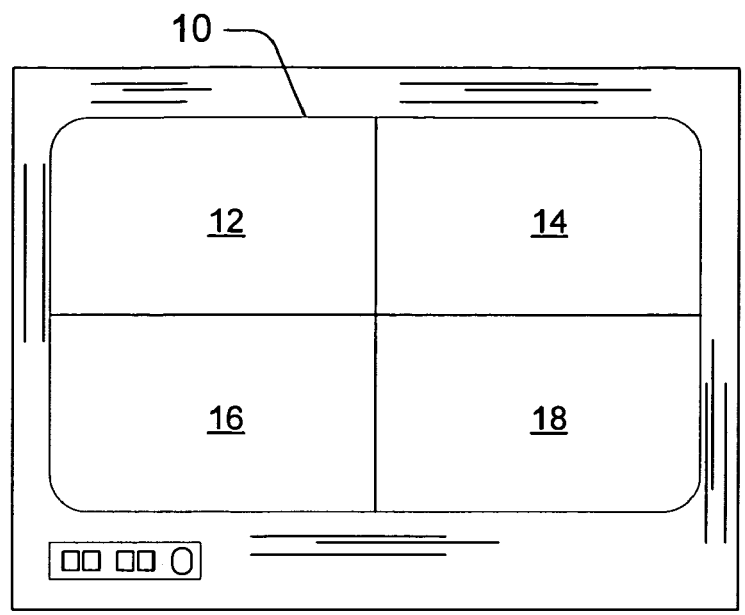
FIG. 1 illustrates a display screen having four individual regions in which visual displays can be presented.
Figure 2:
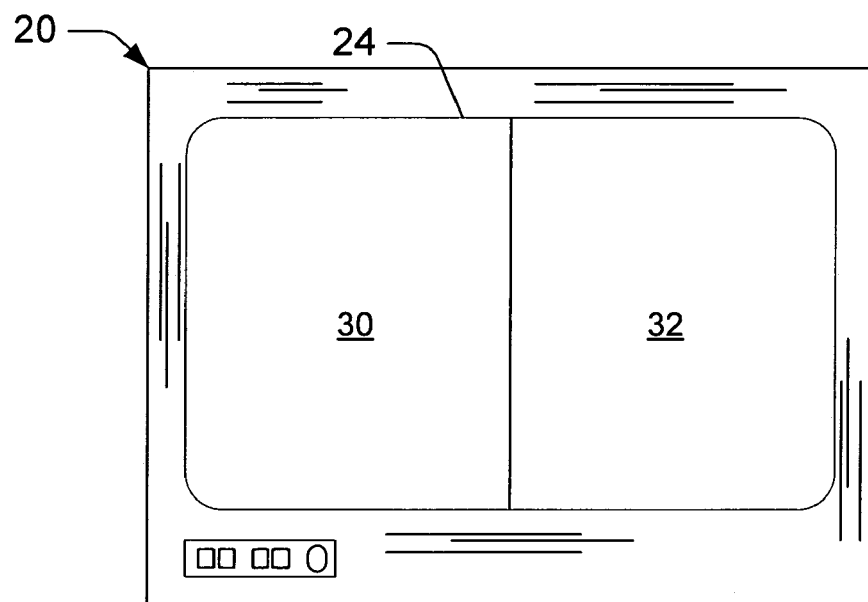
FIG. 2 illustrates a video system in the form of a game console and display screen.
Figure 2:
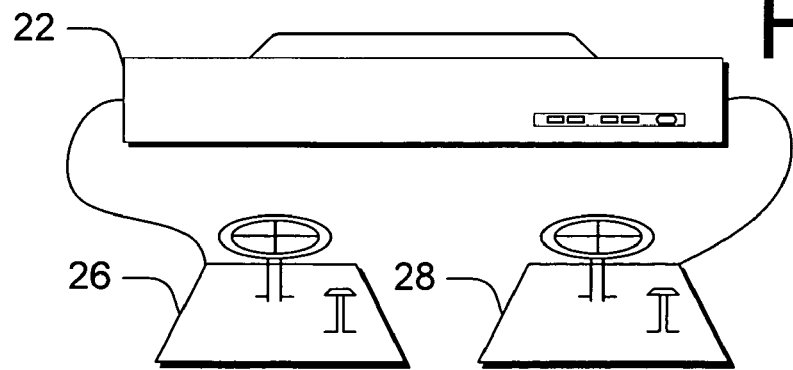

The various embodiments described below provide means by which a video signal, associated with a multi-region visual display intended for presentation on a single display screen, is processed in a manner that enables separate regions to be ascertained, and then split off onto different display screens. Detection algorithms can process the video signal in a manner that detects the divisions between the different regions that are intended for display on a single display screen. Once the divisions are detected, the video signal is processed to split the separate regions onto different display screens.

The inventive techniques described in this document can be utilized in connection with any suitable environment. One particular environment in which the techniques can be utilized is the gaming environment and, in particular, the multi-player gaming environment. It is to be appreciated and understood, however, that application of the claimed subject matter is not to be limited to the gaming environment, except where so specified.

Exemplary Modes of Operation

Before discussing the nuances of the various embodiments, consider the following. Within the context of this document, the particular way that a visual display can be divided up into regions for display on a single display screen is referred to as a mode of operation.

Within the industry, in general, there are typically a limited number of modes of operation which are widely known and used. As an example, consider FIG. 3 which shows a number of different modes of operation at 300-312.

The mode of operation shown at 300 is one in which a single visual display is provided on the display screen. The modes of operation shown at 302 and 304 comprise visual displays that are split into two regions—one of which being split horizontally (302), the other of which being split vertically (304). The mode of operation shown at 306 comprises a visual display that is split into three regions. Similarly, the modes of operation shown at 308 and 310 comprise visual displays that are split into four regions. The mode of operation shown at 310 might be one, for example, that is associated with a gaming environment, with each player's score being contained in the small rectangular sub-region within each individual region. The mode of operation shown at 312 comprises a visual display that is split into two primary regions, with a letter box area (indicated by the cross-hatching) appearing above and below the split regions.

In some of the embodiments described below, the inventive algorithms make use of the fact that there are typically a limited number of modes of operation that are used within the industry. These modes are typically predefined. With this knowledge, the detection algorithms that are employed can be tailored for efficiency, as will become apparent below. Such tailoring based on prior knowledge of the modes of operation is not, however, necessary—although it can be desirable for efficiency purposes.

Rules Used to Split Visual Displays

Within the industry, it has become common practice to split a visual display for presentation on a single display screen in one of a few different ways.

First, the visual display can be split by using one or more bars, such as a thin black bar. For example, a black bar that is a couple of pixels wide can be used to split or divide the visual display into different visually distinct regions. For example, in the mode of operation shown at 302 in FIG. 3, a horizontal black bar can split the screen into the illustrated upper and lower regions.

Second, the visual display can be split by simply providing the visually distinct regions adjacent one another in an edge-to-edge fashion. Here, there is no black bar that is utilized. Rather, the visual distinctiveness of the individual regions is provided by the difference in appearance between the different regions. This appearance differential is typically manifest in a color and/or motion difference between the different regions. For example, the color at the edge boundary of one region may be quite different from the color at the edge boundary of its neighboring region.

Of course, other rules can be used to split a visual display. Those specific rules mentioned above are not intended to limit application of the claimed subject matter, except where so specifically indicated in the claims.

In the various embodiments described below, the methods and systems are directed to processing a video signal and, without any prior knowledge of how the video signal is actually configured, ascertaining whether the video signal is to present a visual display that is split into two or more regions. That is, the methods and systems are configured to identify whether the video signal is associated with a particular mode of operation by using knowledge of the rules that are used to split visual displays (i.e. black bar or edge-to-edge). If a particular video signal is identified as one in which the associated visual display is to be divided into separate regions, then the video signal can be processed so that portions associated with the individual regions are split, resized, and provided to different display screens.

The inventive methods and systems can be configured so that they are independent of the format of the video signal and its associated data. For example, the methods and systems can be utilized with YUV4:2:2, YUV4:4:4, RGB, and the like.

Exemplary Embodiments Overview

Figure 4:
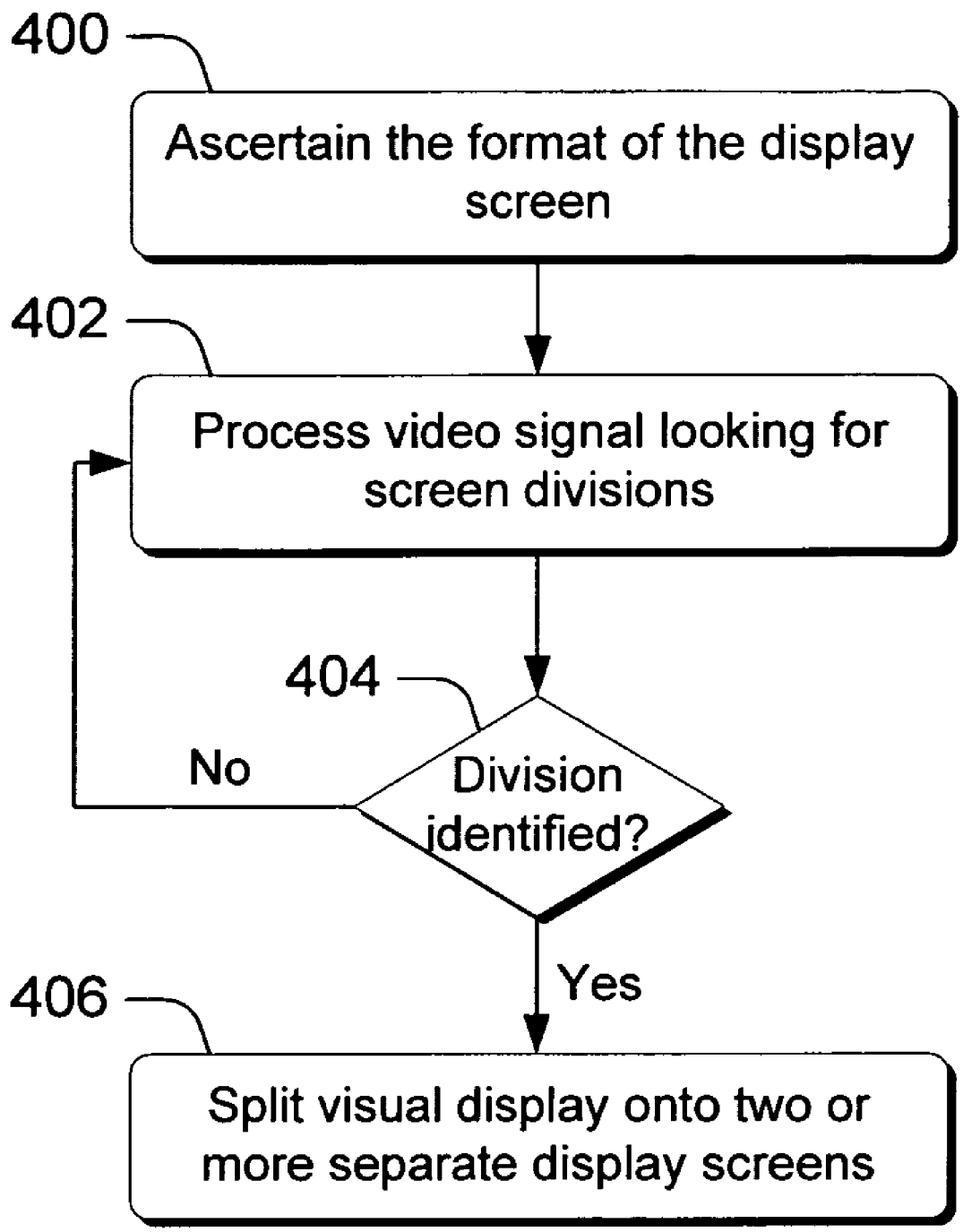
FIG. 4 is a flow diagram that describes steps in a method in accordance with one embodiment.

FIG. 4 is a high level flow diagram that describes steps in a method in accordance with one embodiment. The method can be implemented in any suitable hardware, software, firmware or combination thereof. In some embodiments, the method is implemented in hardware and firmware. Software may be defined as computer-readable instructions stored in a computer-readable medium.

Step 400 ascertains the format of the display screen. Here, the format of the display screen can be ascertained by identifying the number of lines in the so-called active region of the screen, the number of pixels per line, and the like. Step 402 processes a video signal that is intended for presentation on a single display screen and looks for any screen divisions. As noted above, the screen divisions are associated with one or more modes of operation. Step 404 determines whether any divisions are identified or detected. If not, the method returns to step 402 to continue to process the video signal. If, however, screen divisions (i.e. a particular mode of operation) are detected, step 406 splits the visual display onto two or more separate display screens. Specifically, one region of the visual display is rendered on a first display screen; another region of the visual display is rendered on a second display screen, and so on.

As part of this process, the video signal can be processed, resized and the like so that the user or player using the associated display screen is presented with a visually desirable image. One example of such processing is described in U.S. patent application Ser. No. 10/409,496, entitled "Display Source Divider", filed on the same day as this document, naming Mike Love, John Tardif, Chip Coffin, and Jack Scheuer as inventors, assigned to the assignee of this document, the disclosure of which is incorporated by reference.

Allocating Screen Regions where a Screen Division is Likely to Occur

Figure 3:
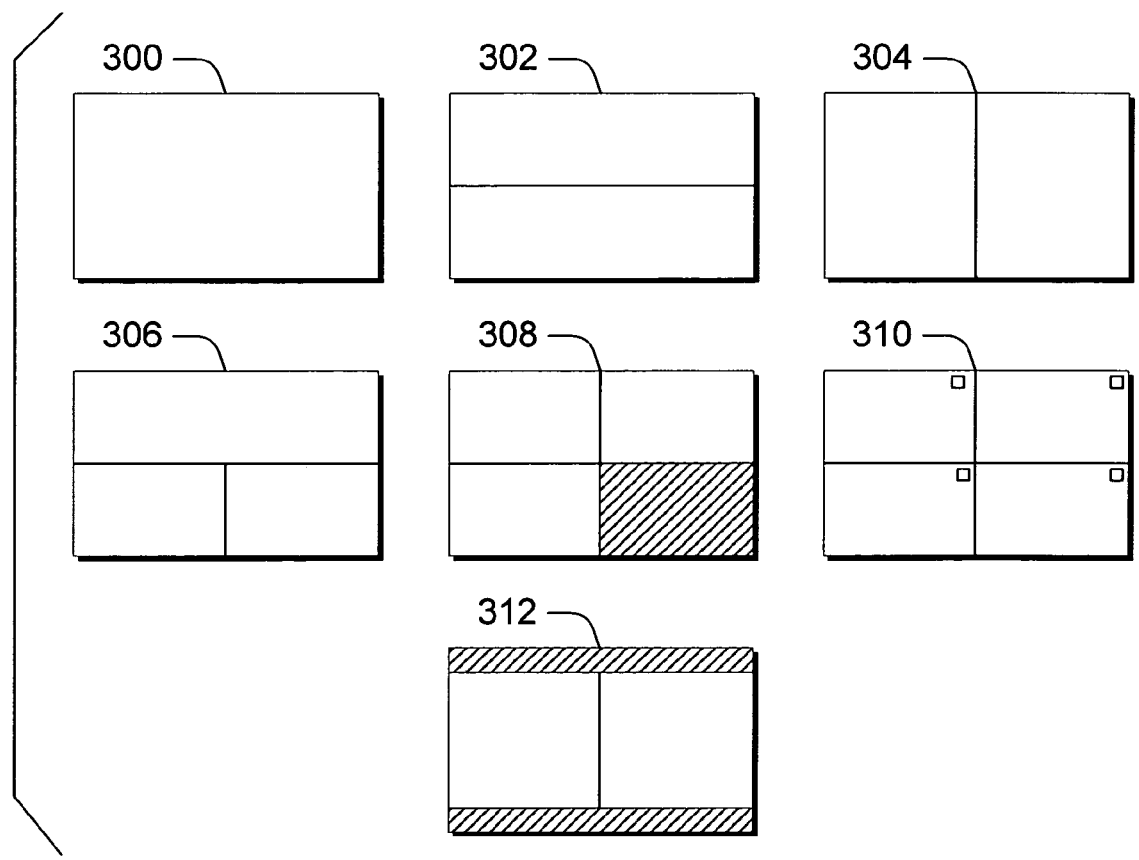
FIG. 3 illustrates a number of different modes of operation, where a mode of operation represents a particular way that a visual display can be divided up into regions for display.

As noted above, some embodiments can make use of knowledge of the number of modes of operation that are typically employed (examples of which are shown in FIG. 3), as well as the rules that are used to divide a visual display (i.e. black bar or edge-to-edge) to specifically tailor detection algorithms so that the algorithms more efficiently look for divisions in the visual display.

Figure 5:
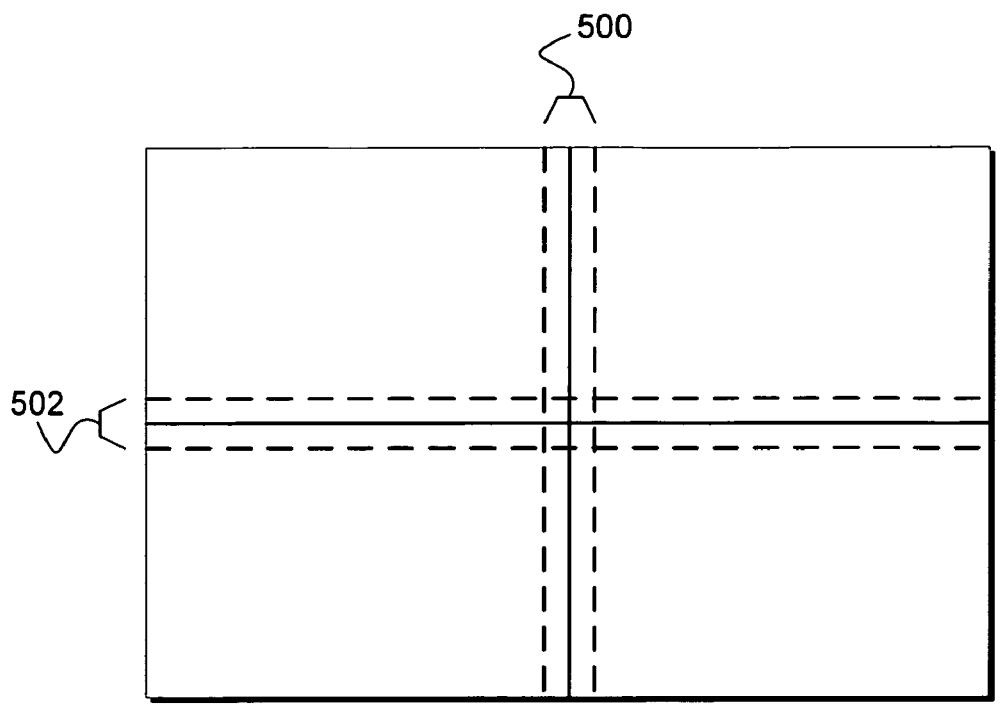
FIG. 5 illustrates one specific mode of operation and superimposes two different allocated regions within which screen divisions can occur.

As an example, consider FIG. 5 which shows a mode of operation that corresponds to that shown at 308 or 310 in FIG. 3. Specifically, in this example, the mode of operation corresponds to a visual display that is to be split into four different regions. Notice also that there are two screen regions that have been allocated—specifically, screen region 500 (corresponding to a region within which a vertical split can occur) and screen region 502 (corresponding to a region within which a horizontal split can occur). These screen regions are allocated based on knowledge of the different modes of operation, and where a screen division is likely to occur. Having these allocated screen regions also provides a degree of tolerance that can permit slight variations in where the divisions actually occur.

Accordingly, when the algorithm processes an associated video signal looking for a screen division (as in step 402 in FIG. 4), the algorithm can be tailored to only process data associated with certain pre-defined screen regions where a screen division is likely to occur. Hence, in this example, the algorithm might only process a video signal's data that corresponds to regions 500 and 502 which, in turn, can help to reduce the processing overhead.

Exemplary Video Signal

Figure 6:
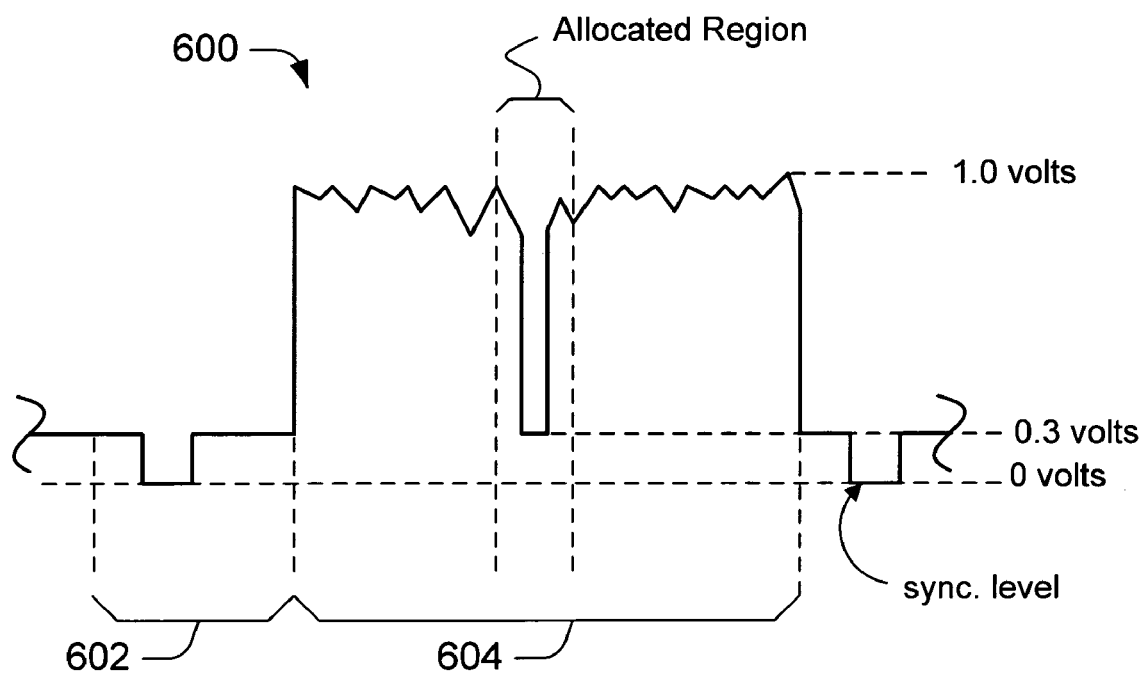
FIG. 6 illustrates an exemplary analog video signal that can be processed in accordance with one or more embodiments.

As one example of how a video signal can be processed to identify a screen division, consider the analog video signal or waveform 600 in FIG. 6. Here, the analog video signal corresponds to one horizontal line of a visual display. In the illustrated waveform, a portion 602 is referred to as the horizontal blanking region, and a portion 604 is referred to as the active region. There is also a wave form portion that is known as the vertical blanking region and is distinct from the horizontal blanking region. The active region portion of the waveform corresponds to what is actually seen on a television screen.

The horizontal blanking region is utilized by a television to trigger a horizontal retrace of the beam that is used to paint the picture on the television screen. When a horizontal retrace is triggered, the beam, which has progressed from the left of the screen to the right of the screen, returns to a next lower line at the left side of the screen to begin another horizontal tracing pass. For an interlaced video display, the next line is two lines down; and for a progressive display, the next line down is one line down.

The vertical blanking region is utilized by the television to trigger a vertical retrace of the beam that is used to paint the picture on the television screen. When a vertical retrace is triggered, the beam returns from the bottommost right side of the screen to the topmost left side of the screen to begin painting a horizontal line at the top of the screen.

Within the waveform's active region 604, the signal can vary between values that are associated with different colors. These values are typically implementation dependent. For example, the color black can be represented as a 0.3 volt value and the color white can be represented as a 1.0 volt value. The horizontal blanking region 602 can be represented by a signal portion having a width whose value is at or below the voltage of the black level, e.g. around 0.3 volts, and the synchronization pulse goes down to around 0 volts for some time duration as specified by the individual video standard.

Vertical Screen Divisions Using Black Bars

When a screen division is implemented as one or more black bars, typically the analog video signal portion which corresponds to the screen division has a waveform portion that extends all of the way down to the black level. That is, there is a characteristic pattern associated with the analog waveform that can indicate the presence of a black bar screen division.

As an example, consider FIGS. 5 and 6 in conjunction with one another. In FIG. 6, notice that the waveform portion in the active region which corresponds to the vertical screen division of FIG. 5 extends all of the way down to a value associated with the black level (i.e. 0.3 volts). Thus, in this example, one horizontal line of the visual display of FIG. 5 has a portion that suggests that there might be a screen division. If, in subsequent waveforms for adjacent horizontal lines of the visual display, the same characteristic pattern is observed in the pre-determined allocated regions in which screen divisions typically occur and in the exact same location (and on every line of active video that is not all black), then the algorithm can conclude that there is indeed a screen split and can process the video signal accordingly.

Added confidence can be gained by observing and recording data associated with the characteristic pattern over several frames of video—say 30 frames or so. This can help to reduce errors that might be present if, for example, the visual display was that of a person peering around the corner of a building, where the building's corner extends all of the way from the top to the bottom of the screen. After a pre-determined number of frames of video, the visual display of the person peering around the building's corner would likely change, whereas the screen division may not.

In practice, searching for the screen divisions can be carried out by converting the analog video signal waveform to a digital form using an analog-to-digital converter. Once the analog signal has been converted to a digital form, pattern analysis of the digital data can be performed in a fairly straight-forward manner. One example of a system that can be utilized to implement the techniques described herein is provided below.

Vertical Screen Divisions Using Edge-to-Edge Technique

Consider now the case of a vertical screen division that does not use black bars, but rather uses an edge-to-edge technique. In this example, the processing can be somewhat different in implementation, but similar in spirit. Specifically, in an edge-to-edge scenario, there is still a characteristic pattern associated with the analog waveform that can indicate the presence of a screen division. Searching for and identifying that pattern can, however, be a little more involved.

Specifically, in the edge-to-edge scenario, a screen division can have a characteristic pattern that indicates a color change within the allocated region of the display screen. For example, one region on the display screen may have the color blue closely adjacent the screen division, while the next adjacent region may have the color red closely adjacent the screen division. Thus, by appreciating the color differential as between the different, adjacent regions, the division detection algorithms can detect screen divisions.

Figure 7:
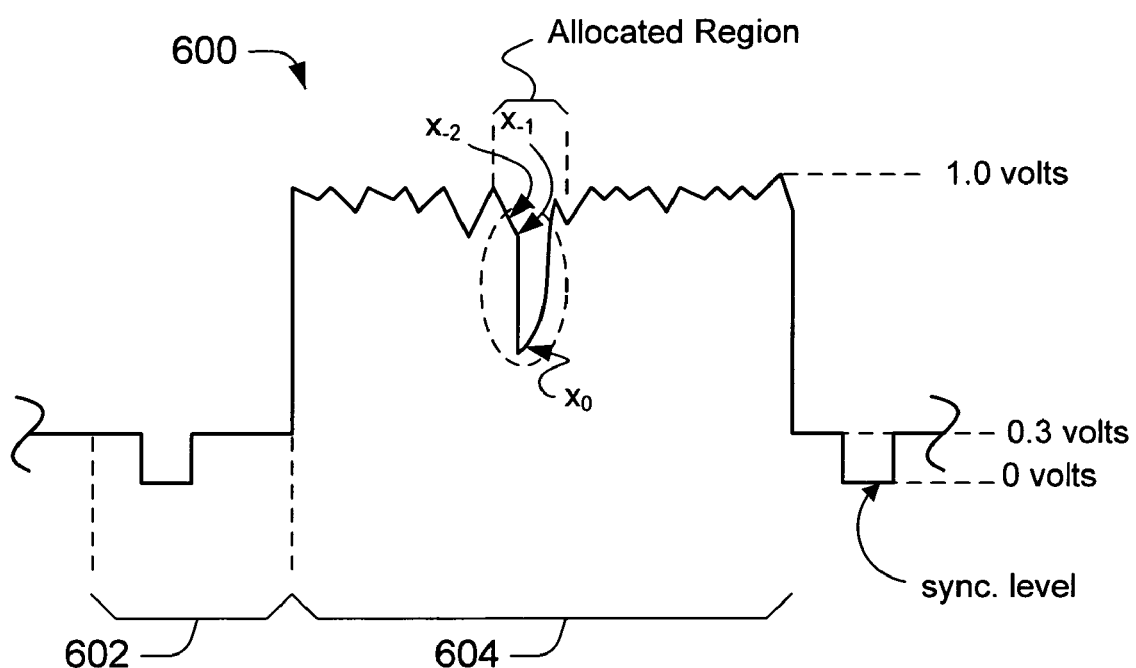
FIG. 7 illustrates an exemplary analog video signal that can be processed in accordance with one or more embodiments.

In this embodiment, a difference parameter is defined which represents the difference value between individual pixels whose analog video signal data has been converted to digital form within the allocated region of interest. As an example, consider FIG. 7 which illustrates an analog waveform for a video signal that contains an edge-to-edge screen division within the allocated region. Here, instead of a waveform transition in the allocated region all of the way down to a value associated with the black level, there is somewhat of a more modest waveform transition in the area encircled with the dashed line.

In this example, consider that three pixels whose analog waveform has been converted to digital form are analyzed. Here, the current pixel is designated as $x_0$ and lies on one side of the screen division, while previous pixels $x_{-1}$ and $x_{-2}$ lie on the other side of the screen division. Assume that a difference parameter is calculated by simply taking the difference in digital pixels values of adjacent pixels. Here, the difference in pixel values between pixels $x_{-1}$ and $x_{-2}$ is relatively small because their corresponding waveform portions are closely adjacent and are of comparable magnitude. However, the difference in pixel values between pixels $x_0$ and $x_{-1}$ is relatively large due to the color transition manifest by the screen division.

If, in subsequent waveforms for adjacent horizontal lines of the visual display, the same characteristic pattern (e.g. the difference parameter value) is observed in the predetermined allocated regions in which screen divisions typically occur, and in the exact same location, then the algorithm can conclude that there is indeed a screen split and can process the video signal accordingly.

Added confidence can be gained by observing and recording data associated with the characteristic pattern over several frames of video—say 30 frames. This can help to reduce errors as noted above.

Exemplary Method for Detecting Screen Divisions

Figure 8:
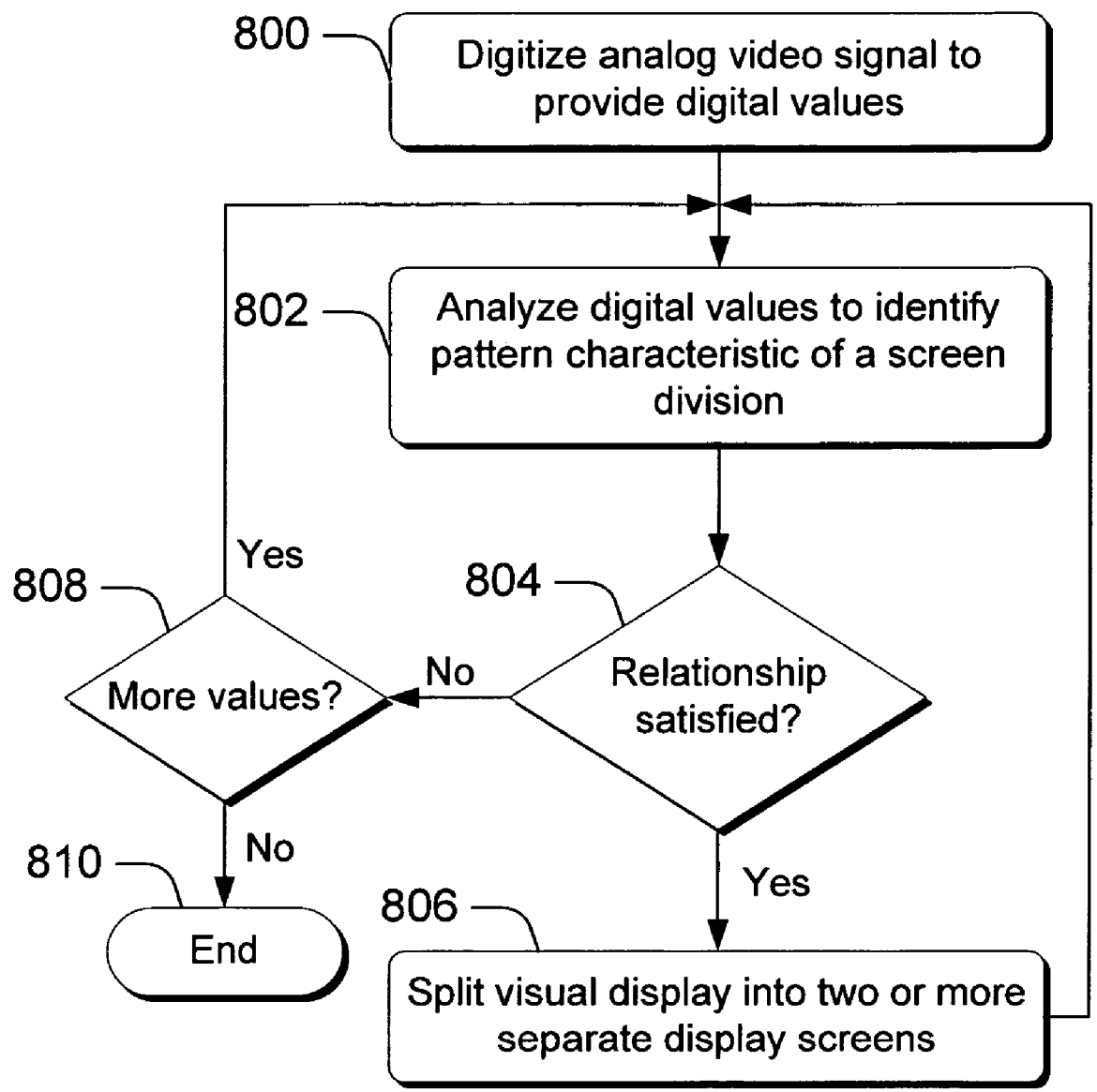
FIG. 8 is a flow diagram that describes steps in a method in accordance with one embodiment.

FIG. 8 is a flow diagram that describes steps in a method in accordance with one embodiment. The method can be implemented in any suitable hardware, software, firmware or combination thereof. In some embodiments, the method is implemented in hardware and firmware.

Step 800 digitizes an analog video signal to provide multiple digital values associated with the waveform. The individual digital values can correspond to individual pixels that are to be presented on a display screen. In the illustrated and described embodiment, the digital pixel values correspond to each pixel's color. Step 802 analyzes the digital pixel values to identify one or more patterns that are characteristic of a screen division. In the example immediately above, the pattern can be one that is associated with a vertical screen division. As will become apparent below, this method can also be utilized to identify horizontal screen divisions.

Any suitable analysis can be performed on the digital pixel values. For example, in the case where a screen division is embodied as a black bar, the digital pixel values can be analyzed to determine whether a certain number of values occur adjacent one another in certain allocated regions in which screen divisions typically occur. For example, if the black bar is represented as a number of values that correspond to the black level, this step would look for those values in the active region. Alternately, in the case where the screen division is implemented as a black bar or an edge-to-edge color transition, this step can be implemented by calculating difference parameters associated with individual pixel values in the allocated region.

Step 804 determines whether the digital values satisfy a relationship that indicates a screen division. This step can be implemented in a number of ways. For example, one relationship that might suggest a vertical screen division is for the digitized pixel values to have the same black level value in the same x location over a majority, or at least half of what would be the visual display. This might suggest a vertical screen division such as those corresponding to modes of operation 304, 306, 308, 310 and 312 in FIG. 3. The relationship can further require that such pixel values be in place for a defined number of frames of video or for a period of time (e.g. for 30 frames or ½ second).

Another relationship that can suggest a vertical screen division is one associated with a difference parameter associated with the individual pixel values. For example, if the difference between pixel values in allocated regions of the display screen have a certain relationship to one another (e.g. a difference of 40% of the largest pixel value) at the same location for a majority of the display screen and for a defined number of frames of video, or for a defined period of time, such can suggest a vertical screen division.

In the event step 804 finds such a relationship, step 806 can split the video display and present the corresponding video portions on different display screens. In practice, this step can be implemented in any suitable way. For example, one way of implementing this step is to set status flags which can be used by the hardware described in the application incorporated by reference above to split the visual display. In the event that step 804 does not establish a relationship between the digital values, step 808 can determine whether there are additional values to analyze. If there are, the method can return to step 802. If there are no additional values to analyze, then the method can end at 810.

Detecting Horizontal Screen Divisions

Horizontal screen divisions, such as those shown by modes of operation 302, 306, 308 and 310, can be detected using a couple of different approaches.

Figure 9:
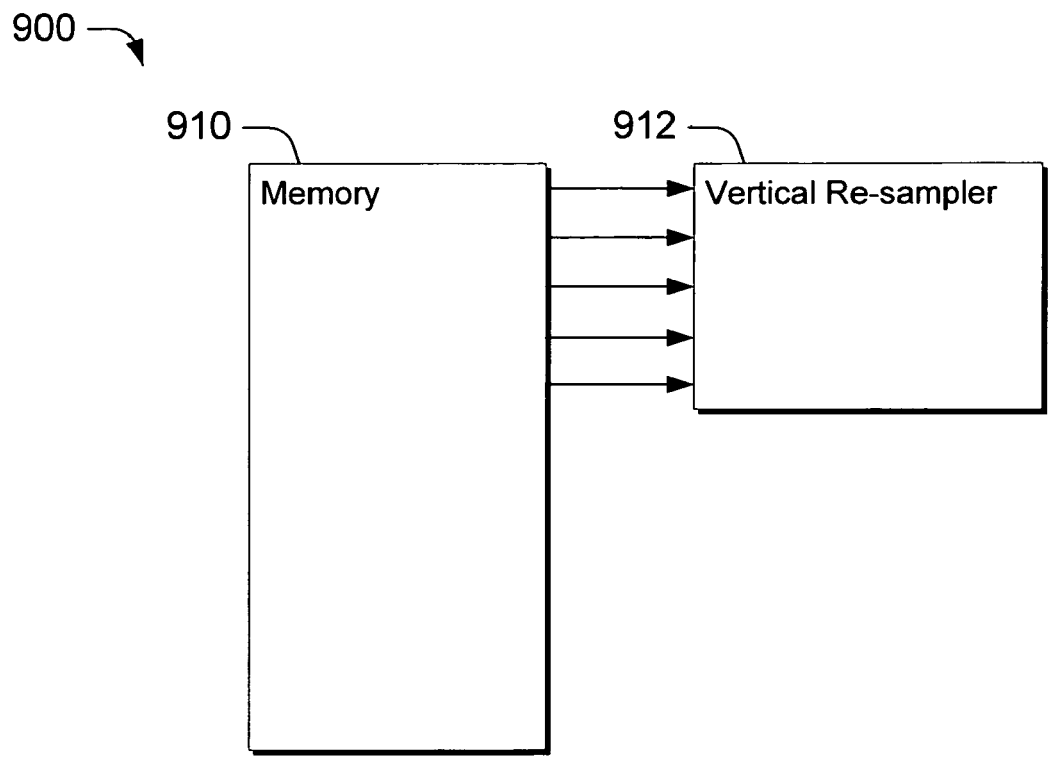
FIG. 9 illustrates an exemplary vertical re-sampler that can be used to evaluate pixel data in accordance with one embodiment.

In one embodiment, a vertical re-sampler can used to evaluate the pixel data. For example, FIG. 9 shows a subsystem 900 that includes a portion of memory 910 and a vertical re-sampler 912. After the analog waveform is digitized, it is typically read into a memory location or buffer, such as memory 910, where it can be accessed and further processed. When the data in the memory 910 corresponds to a particular allocated region where horizontal screen divisions typically occur, the vertical re-sampler, typically a standard component in many video systems, can be used to read out the pixel data for a predetermined number of pixels that lie on top of one another. The pixel data can then be analyzed to determine whether there is a characteristic pattern that suggests a horizontal screen division.

Figure 10:
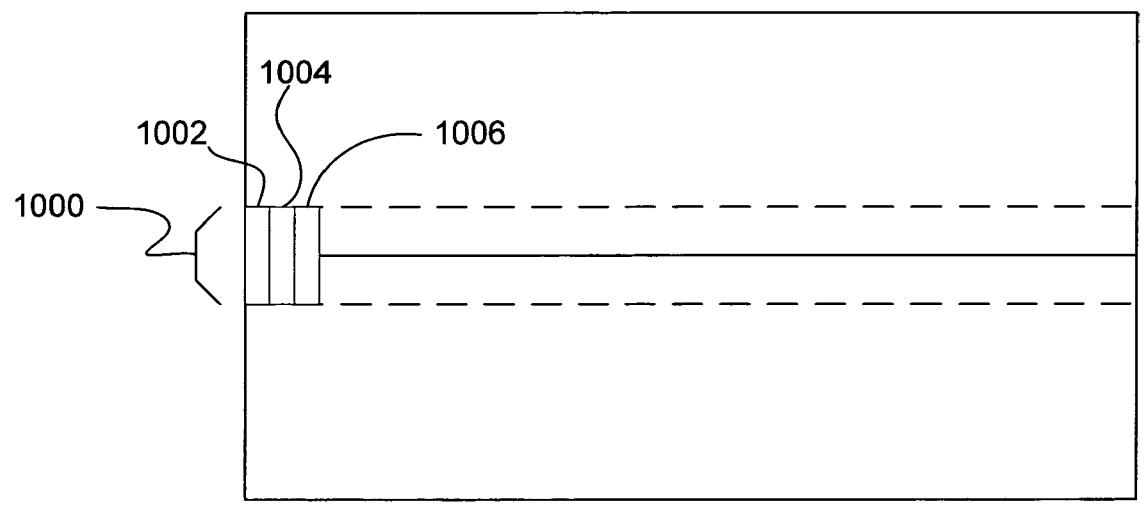
FIG. 10 illustrates a single horizontal screen division and an associated allocated region within which horizontal screen divisions typically occur.

For example, consider FIG. 10 which illustrates a single horizontal screen division and an associated allocated region 1000 within which horizontal screen divisions typically occur. Notice also that individual vertical regions of pixels 1002, 1004, and 1006 are shown. The vertical re-sampler 912 can be used to re-sample these individual regions and ascertain whether the pixel values within these regions satisfy a relationship that is associated with a horizontal screen division. For example, the pixel values at a particular y location may all have a value that is associated with the black level, thus indicating a black bar screen division. Alternately, in the case of either a black bar or an edge-to-edge screen division, the pixel values within a predetermined number of the vertical pixel regions may result in a difference parameter that indicates a horizontal screen division.

Alternately, pixel values associated with an entire line of the visual display can be read into a memory section comprising a line store. There, the algorithm can then analyze adjacent lines of the pixel data to identify any associated relationships that suggest a horizontal screen division. For example, two individual lines can be read in, followed by a third line. Difference parameters can then be calculated for each line—e.g. a difference parameter between lines 1 and 2, and lines 2 and 3. In much the same way that the difference parameter was used above to identify a vertical screen division, the difference parameter can be used to identify a horizontal screen division.

Processing in the case of horizontal screen divisions is typically much faster than the processing for vertical screen divisions. The reason for this is that in the case of vertical screen divisions, because of the top-to-bottom fashion in which the data is produced, the conclusion about a vertical division typically requires a good number of the horizontal lines in any one frame to be processed. In the case of a horizontal screen division, for each segment of the display screen, only a few horizontal lines of pixel data are processed at a time. Once the horizontal lines are processed, a decision can be made as to whether additional frames of corresponding horizontal lines should be processed, or whether the pixel data suggests that there is no horizontal screen division in the region of interest. For example, if five horizontal lines of pixel data do not contain values associated with the blacking level or satisfy a difference relationship, then the conclusion can be made that the visual display, at least in this region, contains no horizontal screen divisions. On the other hand, if the analysis of the data indicates that a relationship between the pixel values is satisfied, then the decision can be made to look at additional frames of the video data at corresponding y locations to ascertain whether these corresponding regions have pixel values that satisfy the same relationship.

Exemplary System

Figure 11:
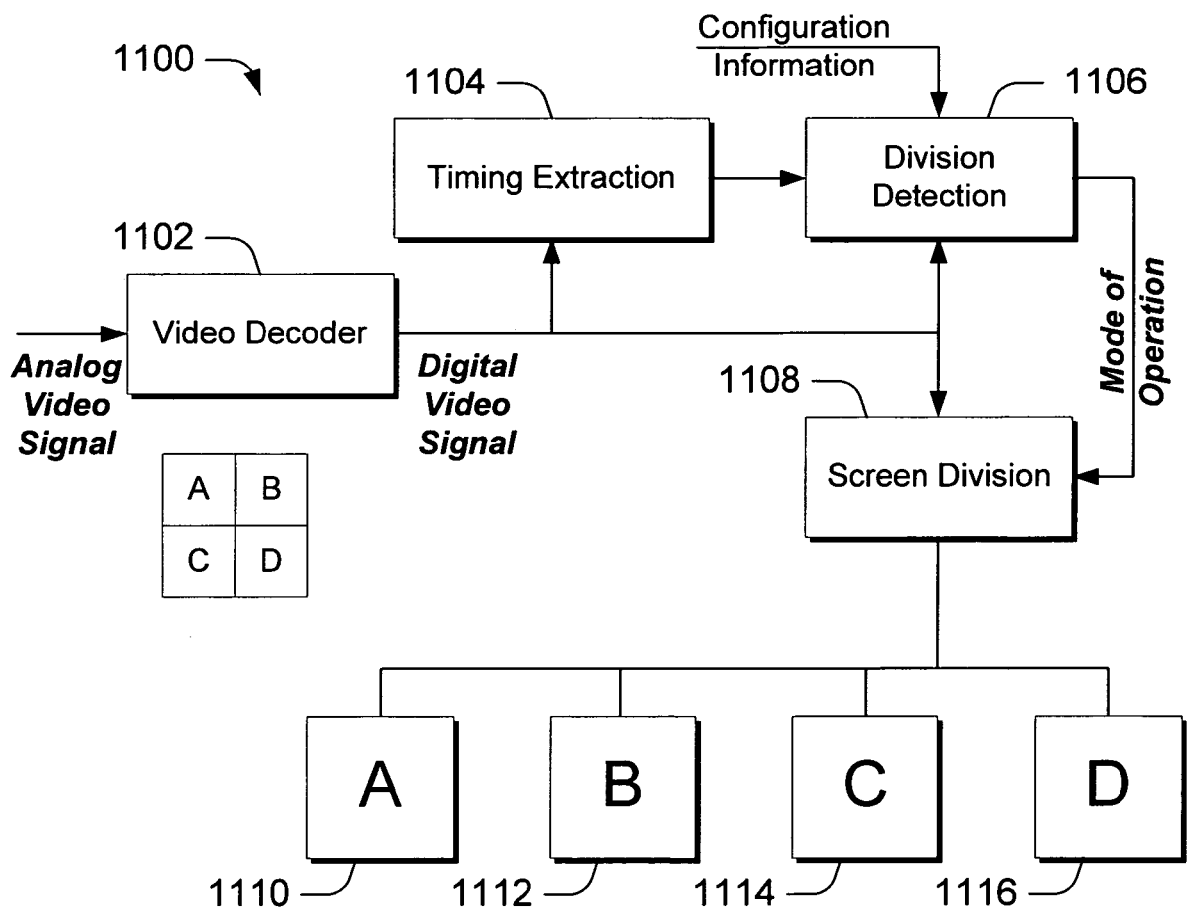
FIG. 11 illustrates an exemplary system in accordance with one embodiment.

FIG. 11 shows an exemplary system 1100, in accordance with one embodiment, that can be utilized to implement one or more of the embodiments described above. Here, system 1100 comprises a video decoder component 1102, a timing extraction component 1104, a division detection component 1106, and a screen division component 1108. In this example, four display screens 1110, 1112, 1114, and 1116 are incorporated for use with system 1100.

In operation, video decoder component 1102 receives, as its input, an analog video signal that is intended for presentation on a single display screen, such as a standard television. The analog video signal can be received in any suitable format. The video decoder component decodes or otherwise digitizes the analog video signal to provide a digital video signal. This digital video signal comprises, as noted above, digitized pixel data that can be processed to identify screen divisions. For example, in the figure, notice that a representation of the visual display embodied by the analog video signal is shown just beneath the video decoder component. The visual display is divided into four regions labeled A, B, C, and D.

In some embodiments, the video decoder component can intelligently digitize the analog video signal and can remove portions of the signal that are not needed for purposes of screen division detection. For example, information associated with the blanking region of the signal can be removed.

Timing extraction component 1104 processes the digital video signal and provides information, such as timing information, to division detection component 1106. The information that timing extraction component 1104 can provide to the division detection component can include information such as the video format (e.g. X×Y format), and timing information such as which line the digital data corresponds with, and line location within a particular line. For example, the timing extraction component can inform the division detection component when the digital data corresponds to a particular allocated region within which screen divisions typically occur, so that the division detection component can perform its analysis, as described above.

Division detection component 1106 receives the digital video signal as well as information from the timing extraction component and processes the digital video signal to identify screen divisions that are intended to be presented on a single display screen. Exemplary techniques for identifying both horizontal and vertical screen divisions are described above.

Additionally, division detection component 1106 can receive configuration information that is associated with tolerances that can be defined for use with the division detection algorithm. For example, one type of configuration information that can be used is information that sets a number of frames for which certain conditions must be true in order for a screen division conclusion to be made. By enabling the division detection component to receive and use configuration information, a flexible approach to identifying screen divisions can be provided. The output of the division detection component is information associated with a mode of operation that has been identified for the digital video signal. In the present example, division detection component 1106 would conclude that the digital video signal corresponds to a mode of operation such as that shown at 310 in FIG. 3.

This information is provided to screen division component 1108 which processes the digital video signal and splits the video between the different display screens. In this example, notice that display screen 1110 presents a visual display associated with region A, display screen 1112 presents a visual display associated with region B, display screen 1114 presents a visual display associated with region C, and display screen 1116 presents a visual display associated with region D.

Exemplary techniques by which the digital video signal is processed and split amongst the different display screens are described in the patent application incorporated by reference above.

Figure 12:
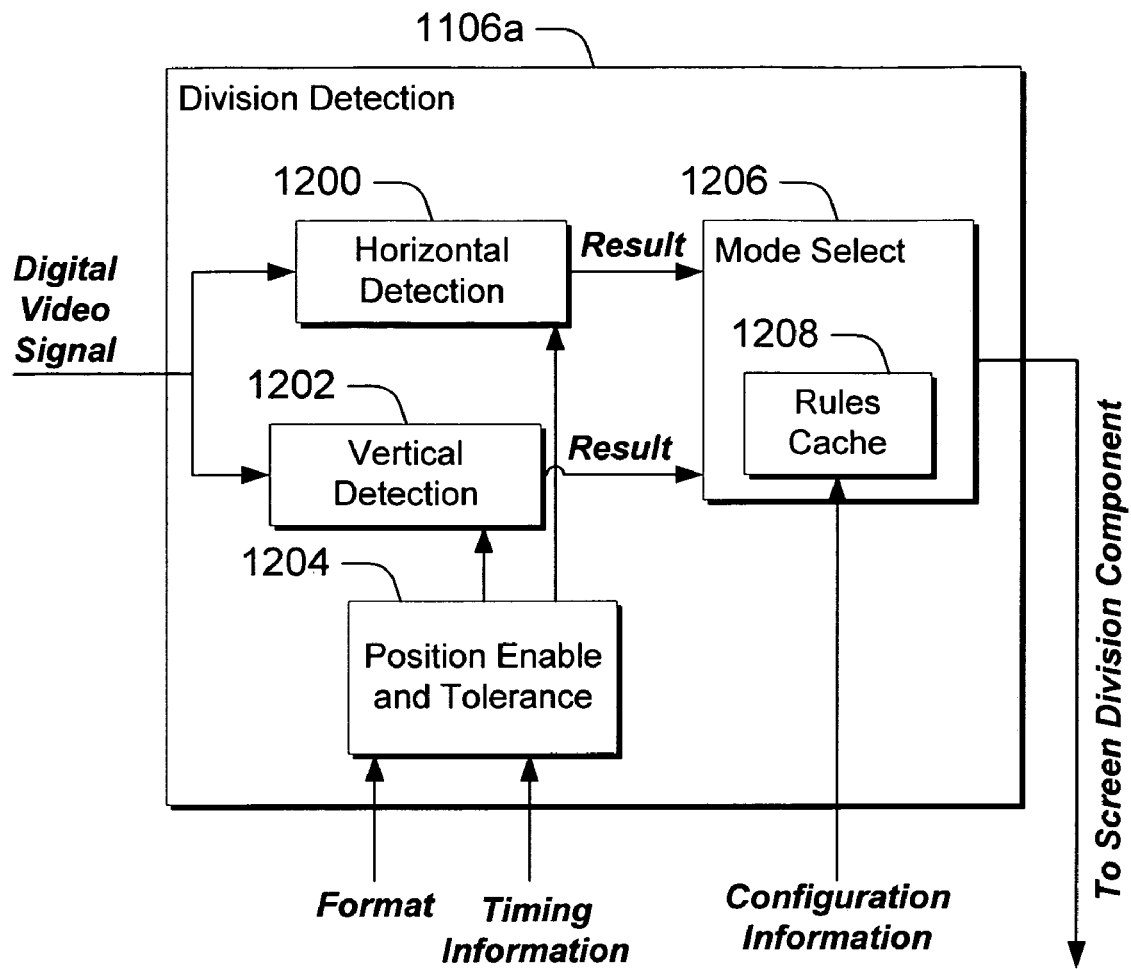
FIG. 12 illustrates an exemplary division detection component in accordance with one embodiment.

FIG. 12 shows an exemplary division detection component 1106a, in accordance with one embodiment, in a little additional detail. Here, component 1106a comprises a horizontal detection component 1200, a vertical detection component 1202, a position enable and tolerance component 1204 and a mode select component 1206. These components can be constructed using any suitable hardware or firmware components. These components typically comprise part of a standard ASIC library.

In operation, horizontal and vertical detection components 1200, 1202 receive, as input, the digital video signal or digitized pixel data. Each of these components processes this data independently and in parallel, using one or more of the algorithms described above to detect, respectively, horizontal and vertical screen divisions. In this embodiment, position enable and tolerance component 1204 receives format information and timing information, and enables the horizontal and vertical detection components at the appropriate times so that each of the components can perform its analysis of the digital data that is received. For example, for particular allocated regions where screen divisions typically occur, component 1204 respectively enables components 1200, 1202 so that the corresponding portions of the digital data can be processed and analyzed as described above.

The horizontal and vertical detection components analyze the appropriate digital signal and then output respective results to mode select component 1206. Mode select component 1206 can comprise a rules cache 1208 that contains rules that are to be used to evaluate the results from the horizontal and vertical detection components. For example, configuration information that defines various tolerances can be used by the rules cache to provide rules that are used to facilitate the decision process for the mode select component. For example, the rules cache may contain rules that establish, on a frame-by-frame or field-by-field basis, certain conditions that need to be satisfied before a particular conclusion is made as to which particular mode of operation is embodied in the digital video signal. Specifically, a rule might specify that in order for a vertical screen division to be present, the same black level values must occur at the exact same x locations for a majority of the screen and for at least 30 frames.

Using the rules cache and the results from the horizontal and vertical detection components, mode selection component 1206 can make a conclusion as to the mode that is present and can then provide this conclusion to a screen division component (such as component 1108 in FIG. 11) which can then take the appropriate steps to divide or split the video signal amongst the different display screens.

In some embodiments, a feedback path can be provided between horizontal and vertical detection components 1200, 1202 and position enable and tolerances component 1204 to enable component 1204 to adjust tolerances to fine tune the processing that is performed by the horizontal and vertical detection components.

Exemplary System Scenario

Figure 13:
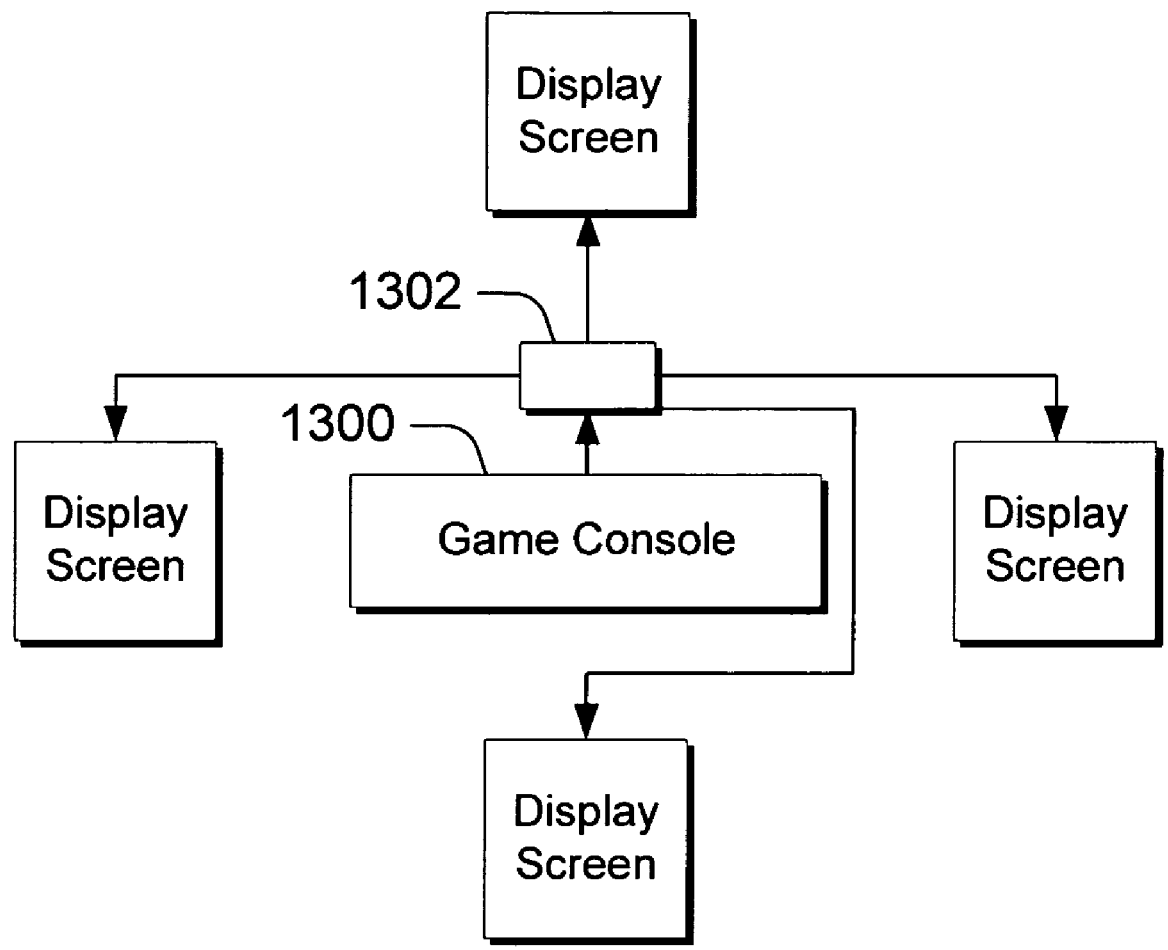
FIG. 13 illustrates one exemplary scenario in which one or more embodiments can be implemented.

FIG. 13 illustrates one exemplary scenario in which the inventive techniques can be employed. In this scenario, a multi-player game system comprises a game console 1300 that contains the electronics that are used to create a game scenario. The game console in this example is a legacy game console that produces an analog video signal that is intended for presentation on a single display screen. A legacy screen splitting component 1302 is provided and, as a stand alone component, is interposed between the game console and multiple display screens. Component 1302 is connected to receive the output of the game console. The legacy screen splitting component 1302 can comprise components such as those that are shown and described in connection with FIG. 11.

Here, the legacy screen splitting component 1302 is an external component that is inserted in the system, between the game console and two or more different television display screens. Accordingly, individual players of the game are able to have their own individual displays that are split apart from the displays of the other players.

Conclusion

The various embodiments described above provide methods and systems that can process video data associated with a visual display that is intended for presentation on a single display screen. The methods and systems can then present individual regions of the visual display on different associated display screens. The embodiments are particularly useful in the context of legacy video systems that do not contemplate provision of a visual display onto multiple different display screens. One environment in which the various embodiments can be employed is the multi-player gaming environment.

Although the invention has been described in language specific to structural features and/or methods, it is to be understood that the invention defined in the appended claims is not necessarily limited to the specific features or methods described. Rather, the specific features and methods are disclosed as exemplary forms of implementing the claimed invention.

The invention claimed is:

1. One or more computer-readable media embodying computer-readable instructions thereon which, when executed, implement a method comprising:
    receiving an analog video signal that is intended for presentation on a single display screen;
    digitizing the analog video signal to provide a digital video signal;
    ascertaining whether the digital video signal is associated with one or more of a number of known modes of operation, where individual modes of operation are associated with particular ways in which a visual display can be divided up into multiple regions for display on a single display screen; and
    in an event that the digital video signal is associated with a particular mode of operation, processing the digital video signal in a manner that permits individual regions of the multiple regions to be presented on different display screens.

2. The computer-readable media of claim 1, wherein the act of receiving the analog video signal is performed by receiving a signal produced by a multi-player game console.

3. The computer-readable media of claim 1, wherein the act of receiving the analog video signal is performed by a stand alone component interposed between a multi-player game console that produces the analog signal and the different display screens.

4. The computer-readable media of claim 1, wherein the act of ascertaining comprises evaluating the video signal for one or more horizontal screen divisions within one or more allocated regions associated with locations where horizontal screen divisions typically occur.

5. The computer-readable media of claim 1, wherein the act of ascertaining comprises evaluating the video signal for one or more vertical screen divisions within one or more allocated regions associated with locations where vertical screen divisions typically occur.

6. The computer-readable media of claim 1, wherein the act of ascertaining comprises:
    evaluating the video signal for one or more horizontal screen divisions within one or more allocated regions associated with locations where horizontal screen divisions typically occur; and
    evaluating the video signal for one or more vertical screen divisions within one or more allocated regions associated with locations where vertical screen divisions typically occur.

7. One or more computer-readable media having computer-readable instructions thereon which, when executed, implement a method comprising:
    receiving an analog video signal that is intended for presentation on a single display screen;
    digitizing the analog video signal to provide a digital video signal;
    with a knowledge of rules that are used to divide visual displays, ascertaining whether the digital video signal is associated with one or more of a number of known modes of operation, where individual modes of operation are associated with particular ways in which a visual display can be divided up into multiple regions for display on a single display screen;
    in an event that the digital video signal is associated with a particular mode of operation, processing the digital video signal in a manner that permits individual regions of the multiple regions to be presented on different display screens.

8. The computer-readable media of claim 7, wherein the act of receiving the analog video signal is performed by receiving a signal produced by a multi-player game console.

9. The computer-readable media of claim 7, wherein the act of receiving the analog video signal is performed by a stand alone component interposed between a multi-player game console that produces the analog signal and the different display screens.

10. The computer-readable media of claim 7, wherein the act of ascertaining comprises evaluating the video signal for one or more horizontal screen divisions within one or more allocated regions associated with locations where horizontal screen divisions typically occur.

11. The computer-readable media of claim 7, wherein the act of ascertaining comprises evaluating the video signal for one or more vertical screen divisions within one or more allocated regions associated with locations where vertical screen divisions typically occur.

12. The computer-readable media of claim 7, wherein the act of ascertaining comprises:
    evaluating the video signal for one or more horizontal screen divisions within one or more allocated regions associated with locations where horizontal screen divisions typically occur; and evaluating the video signal for one or more vertical screen divisions within one or more allocated regions associated with locations where vertical screen divisions typically occur.

13. The computer-readable media of claim 7, wherein one rule divides a visual display using a black bar.

14. The computer-readable media of claim 7, wherein one rule divides a visual display without using a black bar.

15. The computer-readable media of claim 7, wherein one rule divides a visual display in an edge-to-edge fashion.

16. The computer-readable media of claim 7, wherein one rule divides a visual display using a black bar and another rule divides a visual display in an edge-to-edge fashion.

17. A method comprising:
- providing a video decoder component for digitizing an analog video signal associated with a visual display that is intended for presentation on a single display screen;
- providing a timing extraction component for processing a digital video signal associated with the analog video signal to provide timing information;
- providing a division detection component configured to receive the timing information and process the digital video signal to identify screen divisions that are intended to be presented on the single display screen, the division detection component being configured to output information associated with an identified screen division;
- wherein the division detection component is configured to identify screen divisions within certain allocated regions where screen divisions typically occur; and
- providing a screen division component configured to receive information output from the division detection component and use the information to process the digital video signal in a manner which can present different regions of the visual display on different display screens.

18. The method of claim 17, wherein the division detection component comprises a horizontal detection component for detecting horizontal screen divisions, and a vertical detection component for detecting vertical screen divisions.

19. The method of claim 17, wherein the division detection component comprises:
- a horizontal detection component for detecting horizontal screen divisions;
- a vertical detection component for detecting vertical screen divisions; and
- a rules cache that contains rules that are used to evaluate results produced by the horizontal and vertical detection components.

\* \* \* \* \*